Nov. 24, 1953     H. K. NORTH ET AL     2,660,017
BEET TOPPING MACHINE
Filed Nov. 2, 1951
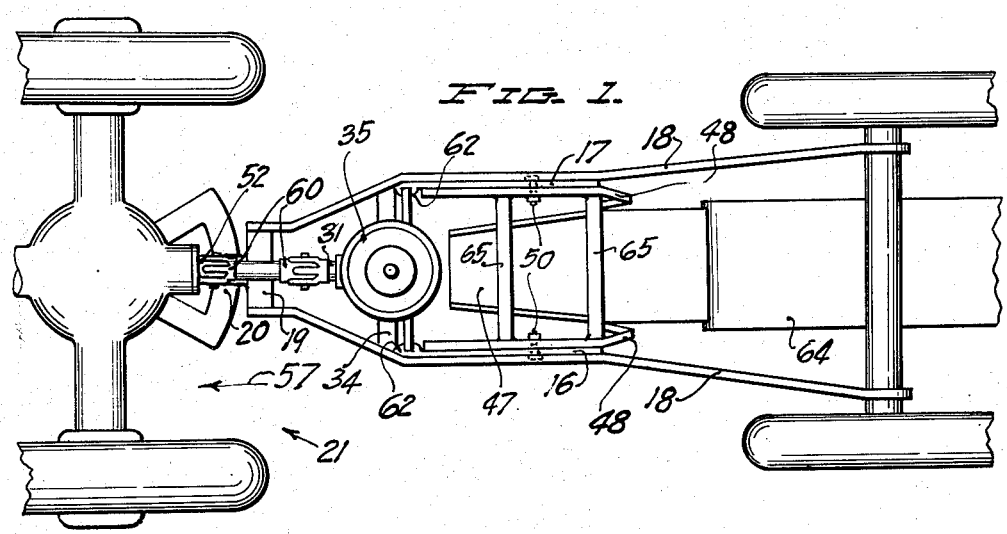
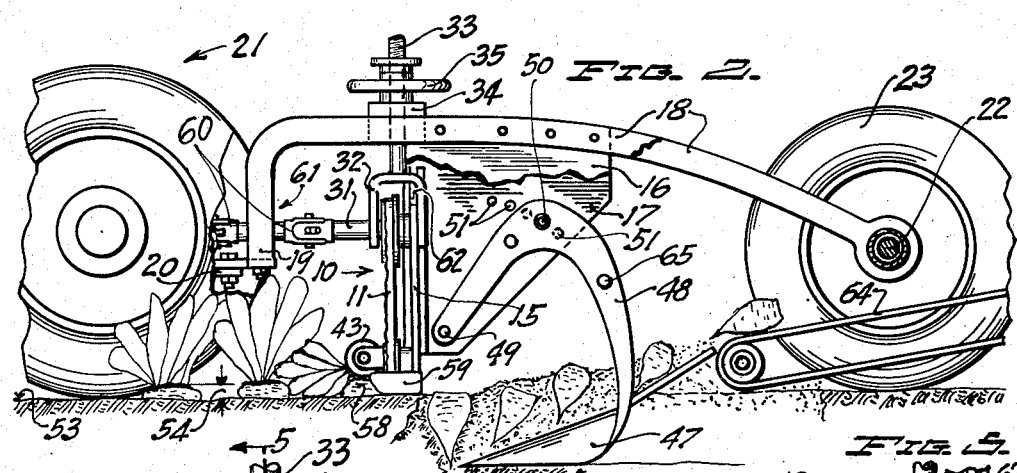
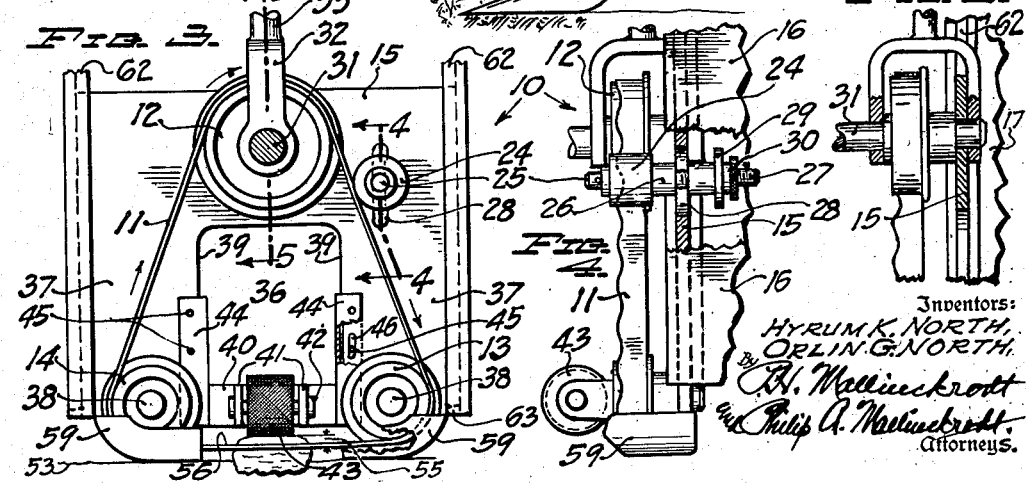
Inventors:
HYRUM K. NORTH,
ORLIN G. NORTH,
Attorneys.

Patented Nov. 24, 1953

2,660,017

UNITED STATES PATENT OFFICE 2,660,017

BEET TOPPING MACHINE

Hyrum K. North and Orlin G. North, Salt Lake City, Utah

Application November 2, 1951, Serial No. 254,526

3 Claims. (Cl. 56—121.42)

This invention relates to agricultural implements for removing the leafy tops of root crops in the field, and has particular reference to sugar beet toppers.

Sugar beets are grown extensively in certain areas of this country and abroad. Their cultivation and harvest require considerable and arduous manual labor unless machinery is used for the purpose. In the mechanical topping of sugar beets, it is common to harvest the beets by first removing the tops while the beets are in the ground, and then digging or lifting the beets themselves. Usually the beets are lifted out of the ground by a suitable plow or other lifting implement immediately following the topping operation. Different types of beet topping apparatus have been developed heretofore both for use alone and for use in conjunction with beet lifting mechanism, but these have all left considerable room for improvement.

In particular, it has been found especially difficult to achieve clean and positive topping of sugar beets in the field, without at the same time removing excessive portions of the crowns. This is due largely to the fact that the individual beets protrude greater or lesser distances above the level of the soil, and, further, vary in size and bushiness of tops.

While prior machines for the purpose have taken these factors into account, it appears they have not satisfactorily solved the problems presented, and, in practically all instances, have included complicated and expensive mechanisms.

It is a primary object of this invention, then, to provide a machine of simple construction, which will expeditiously and efficiently remove the leafy tops from growing root crops of the nature of sugar beets, without cutting unduly into the crowns of the roots. To this end, instead of employing the usual rotatable disk cutters, we contemplate using a relatively endless, slicing band which can be driven at a relatively high velocity, thereby eliminating a large part of the frictional losses which occur with disk cutters.

We are concerned, also, with providing apparatus which will be economical to construct, and, therefore, which will be readily available to the small beet grower who must watch expenditures in order to make his crops profitable.

An outstanding feature of our invention in the accomplishment of the above objects, is the provision of a topping regulator in close association with a band knife. For simplicity and economy of construction as well as positive action, we prefer to mount these two operative parts of our machine on a common framework adapted to oscillate upwardly and downwardly in conformity with the extent to which the respective beets protrude from the ground. In this way, it is possible to maintain a given relationship between the topping regulator and the topping knife at all times during operation. Despite this constant relationship between regulator and knife, the apparatus conforms in operation to the irregularities of growing beets in the field.

This apparatus may be conveniently utilized in connection with standard beet loading mechanism, and is preferably arranged for hitching behind a tractor.

Further objects and features of the invention will become apparent from the following detailed description of the particular preferred embodiment illustrated in the accompanying drawing, where:

Fig. 1 represents a plan, portions being broken away for convenience;

Fig. 2, a side elevation corresponding to Fig. 1, portions being broken away for convenience;

Fig. 3, a front elevation of the cutting mechanism alone, drawn to an enlarged scale;

Fig. 4, a side elevation, corresponding to Fig. 3, this view being partially in vertical section taken along the line 4—4 in Fig. 3;

Fig. 5, a fragmentary vertical section taken along the line 5—5 in Fig. 3.

Referring to the drawing, the numeral 10 denotes the cutting mechanism proper. This includes an endless knife band 11 made, for example, of a saw-steel which is narrow and quite thin so that it will pass readily around a series of guide wheels or pulleys 12, 13 and 14. The guide wheels are preferably arranged in the form of a triangle, for example, an isosceles triangle, and are preferably mounted on a gauging plate 15 which is slidably disposed in a structure which includes side plates 16 and 17. The side plates are secured to longitudinally extending frame members 18, which in this instance, have approximately the configuration shown in Fig. 1. Here, the front portions 19 of the respective frame members are bent down to form an inverted fork-like connection which, in this instance, is removably secured to the draw bar 20 of a common farm tractor 21. The rear portions of the frame members 18 are preferably curved and are supported on an axle 22 on which are mounted traction wheels 23, these wheels being provided with rubber tires as usual.

It is desirable that the cutting blade 11 be arranged for tensioning as required.

The guide wheel 12 serves in this instance to drive the band cutter 11 while the guide wheels 13 and 14 serve as idlers. The drive wheel 12 is secured on a stub shaft 31 which latter is rotatably disposed in the depending yoke or fork 32. The yoke has a fixed threaded stem 33 which extends upwardly through a crosspiece 34 without having its threads engaged by the latter. Engaging the threaded stem 33 is a handwheel 35 which in turn rests on the crosspiece 34. By turning the handwheel 35, the plate 15 with its appurtenances, is raised or lowered for gauging the extent of topping roots which are in the ground. This will be more fully explained, later.

The gauging plate 15 is bifurcated so as to provide an opening 36 intermediate the two depending legs 37. In this instance, arbors 38 are mounted at the respective lower end portions of the legs and serve as journal pins for the guide wheels 13 and 14. Along the respective inner edges 39 of the legs 37 is slidably mounted a frame 40. This frame has bracket lugs 41 in which is mounted a journal pin 42. The pin 42 carries a rotatable roller 43 which latter has its face roughly knurled for a purpose that will appear presently. The frame 40 has upwardly extending arms 44, these being secured to the plate 15 by means of screws or bolts 45 which pass through respective slots such as 46 in order to allow the roller 43 to be adjusted up and down along the plate 15.

As here shown, there is suitably positioned back of the cutting mechanism 10, a digging plow 47 which may be of any well known design. This plow is mounted on a beam, consisting for example, of members 48 which latter are pivotally disposed at 49 in the plates 16 and 17. The beam members 48 are thus adjustable up and down, and respectively are secured to the plates by bolts 50. A series of holes 51 is provided in the plates 16 and 17 for bolting the plow 47 at different levels as may be required.

The cutting mechanism 10 is driven by means of the stub shaft 31 which receives its power from any standard power take-off shaft 52 forming part of the tractor 21.

The manner of using the present root topper will now be described as used in connection with the harvesting of sugar beets, this being representative of other root crops. A successful farmer selects his seed and the land on which it is planted carefully so that the quantitative relation between the root portion which constitutes the valuable part of the crop, and the tops which are less valuable, is fairly predictable. Such a predictable determination of uniformity is quite useful since it prevents undue changing of adjustments of the various parts in the harvesting machinery. For example, the crowns of the beets protrude from the ground, which means the cutting knife needs to be adjusted only infrequently if the crop growth is fairly uniform. Again, the relation of the foliage volume varies considerably with respect to the roots. If such volumetric relation is fairly uniform then corresponding adjustments of the machinery can be correspondingly uniform.

In the present instance, the average protrusion of the beet crowns above the surface of the ground 53 is indicated at 54. Consequently, the roller 43 is set a certain predetermined distance 55 above the significant portion 56 of the knife band 11, so that a minimum of waste of the valuable root ensues. Similarly, the position of the plow 47 is changed, but only infrequently if the depth of the roots is fairly uniform.

Assuming now that the proper adjustments have been made, the machine of the invention is drawn by its tractor 21 in the direction of the arrow 57. As the roller 43 in its forward travel encounters a beet 58, as indicated in Fig. 1, the roller 43 causes the cutting mechanism 10 to rise or fall, and maintains a definite distance between the roller and the cutting blade portion 56. The normal position of the roller 43 is determined by the shoes 59 which normally slide over the ground 53. Since the cutting mechanism 10 is freely movable up-and-down, the roller 43 flattens the beet tops and automatically lifts the cutting assembly 10 to the height which determines the level at which the beet is topped. The downward movement of the cutting assembly is accomplished by gravity.

The connection of stub shaft 31, to the power take-off shaft 52 is rendered flexible by means of universal joints, for illustration as shown at 60 in proximity to the fork 61.

Up-and-down travel of gauging plate 15, which serves as a mounting member of the cutting mechanism is facilitated by the grooved formation at 62 having stops at 63.

The operation of this topping machine can be visualized by referring to Fig. 2. Here the beets with a certain amount of soil are rising by action of the plow 47. The beets in this instance are being deposited on a conveyor 64, which, however, forms no part of the invention.

In the present simple form, the tensioning device includes a gauging roller 24, which is rotatable on an arbor 25, the latter having a shouldered collar 26 and an extension pin 27 both of which preferably are integral with the arbor. The pin 27 passes through a slot 28 in the plate 15, and by means of a thumb wheel 29 which is threaded on the stem 27 and is securely clamped in place as desired. The thumb wheel is prevented from loosening by a lock nut 30.

The body portions of the two frame members 18 are preferably connected to each other, in this instance by means of spreaders 65.

Advantageous features of the cutting mechanism are that the knife band has maximum sharpness and is easily replaceable. Being narrow and thin, the knife band follows regulation quite precisely. Furthermore, being relatively inexpensive, a sufficient stock of extras can be kept on hand for replacing worn blades.

What is claimed is:

1. A root-topping machine, comprising the combination, with a structural frame adapted to extend substantially horizontally over the ground, and means for supporting said frame above the ground for movement thereover, of mutually opposing and spaced slideway members depending from fixed securement to said frame transversely of the longitudinal axis of the latter; a gauging and cutting mechanism slidably mounted in and between said slideway members for up and down vertical movement therein, said mechanism including a substantially rectangular supporting plate bifurcated upwardly from its lower edge and directly slidably received by said slideway members, guide wheels journaled in mutually spaced relationship on one face of said plate, an endless knife band received by said guide wheels and having a portion thereof extending across the bifurcation of said plate adjacent the lower margin of the latter in position for cutting off protruding tops of roots growing in the ground; a gauging roller assembly rigidly secured to said plate and extending across said bifurcation in advance of said knife band portion, and means for driving said knife band; mounting stem means extending upwardly from rigid securement to said supporting plate; passage means in said frame through which said mounting stem means slidably pass for free up and down movement; and suspension means vertically adjustably secured to said stem means above the frame and normally resting on the latter for suspending said gauging and cutting mechanism in given adjusted but floating position relative to the surface of the ground.

2. The combination recited in claim 1, wherein a single, threaded mounting stem extends upwardly from rigid securement to the supporting plate midway of the width of the latter; and wherein the suspension means comprises a hand wheel in threaded engagement with said stem.

3. The combination recited in claim 2, wherein the means for driving the knife band comprises a rotatable shaft journaled in the supporting plate midway of the width of the latter, one of the guide wheels for the endless knife band being secured to said shaft; and wherein the mounting stem extends upwardly from a fork which straddles said guide wheel and has one of its members secured to said supporting plate and the other of its members journaled on said shaft.

HYRUM K. NORTH.
ORLIN G. NORTH.

References Cited in the file of this patent

UNITED STATES PATENTS

| Number | Name | Date |
|---|---|---|
| 1,768,195 | Driscoll | June 24, 1930 |

FOREIGN PATENTS

| Number | Country | Date |
|---|---|---|
| 890,465 | France | Nov. 2, 1943 |